Dec. 8, 1936.  C. F. KRAMER  2,063,170

EYEGLASS MOUNTING AND METHOD OF PRODUCING SAME

Original Filed April 12, 1930

Witnesses:
Harry C. L. White.
Robert Cremer

Inventor:
Cletus F. Kramer.
By Edward Fay Wilson
Atty.

Patented Dec. 8, 1936

2,063,170

UNITED STATES PATENT OFFICE 2,063,170

EYEGLASS MOUNTING AND METHOD OF PRODUCING SAME

Cletus F. Kramer, Chicago, Ill., Central Republic Trust Company, executor of said Cletus F. Kramer, deceased, assignor, by mesne assignments, to Bausch & Lomb Optical Company, Rochester, N. Y., a corporation of New York Application April 12, 1930, Serial No. 443,791
Renewed October 22, 1936

23 Claims. (Cl. 88—47)

This invention relates to improved means and methods for mounting eye glass lenses. The object is to provide a mounting which shall be extremely simple; which will require but a straight, cylindrical hole in the lens; which will reduce the possibility of loosening to a minimum; which shall be so small as hardly to be noticeable; and by which the ophthalmic glass can be readily and easily secured in the mounting.

The invention resides in a mounting comprising a thin hollow frame member adapted to fit over the edge portion of the lens and be secured in place by being filled with a relatively softer metal. The lens has a perforation within the area of the clasping part of the frame member and the binding metal is anchored to the lens by filling in the perforation. In practice, one side part of the frame is provided with an opening adapted to register with the opening in the lens and permit the application of the binding metal in a soft state, preferably produced by heating the binding metal slightly above its melting point. Preferably, though not necessarily, the inner surface of the frame which contacts with the binding metal is prepared so that when the binding metal is applied to fill the hollow frame member and the hole in the lens, the binding metal will be bonded to the frame member.

Further, to avoid all possibility of any pivotal movement of the lens in the frame, the frame may be and preferably is provided with extensions at the sides adapted to extend out and contact with the edge of the lens at each side of the mounting.

The invention will be more readily understood by reference to the accompanying drawing forming part of this specification and in which:—

In said drawing 1 represents an eye glass lens and is typical of any lens to be mounted in a metallic bridge or any other device to which the lens is to be secured.

Figure 1:
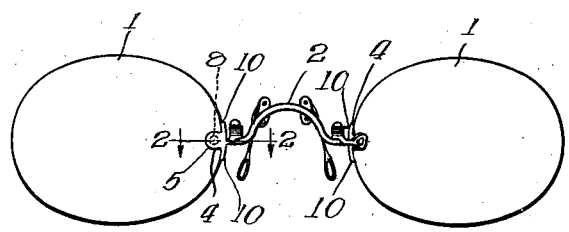
Fig. 1 is a front view of a pair of eye glasses, the lenses being secured in accordance with this invention.

The most usual device to which the lens is attached is a metallic bridge device 2 to which two of the lenses are attached, as shown in Fig. 1. It should be understood that while I have illustrated the invention as applied to the attachment of the lens to the bridge, the invention is not thus limited.

In preparation for the attachment of the lens, it is only necessary to bore one small hole 3 through the lens at the place where the bridge or other device is to be attached.

The bridge or other device is formed to provide a lens edge engaging part 4 which is securely attached to, or forms an integral part of the bridge 2.

Figure 2:
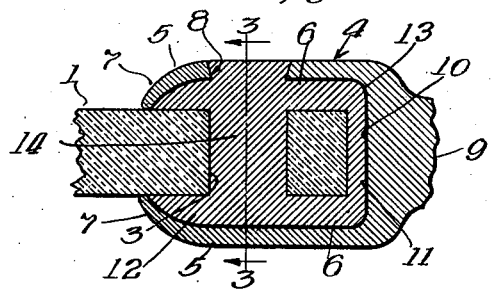
Fig. 2 is a very greatly enlarged, fragmentary section on the line 2—2 of Fig. 1.
Figure 3:
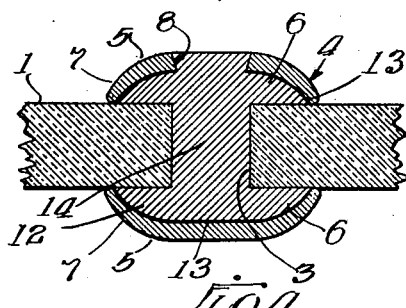
Fig. 3 is a fragmentary section on the line 3—3 of Fig. 2.
Figure 4:
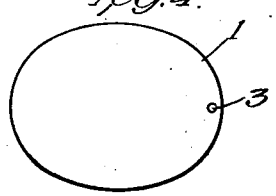
Fig. 4 is a plan view of one of the lenses showing a hole therein made in preparation for mounting the lens.

This part 4 consists of two opposed relatively flat parallel projections 5, which are formed somewhat concave in shape so that when placed upon the edge of the lens, a hollow space 6 is provided at each face of the lens, and these spaces are closed at their peripheries by the formed down edges 7 of the flat projections 5. One of the projections 5 is provided with a perforation 8, adapted to be registered with the opening 3 in the lens when the lens is placed in between the projections 5 for mounting. The projections 5 are both connected to and extend out parallel from a base portion 9, which forms part of the bridge 2. The base 9 has transversely extending projections 10 adapted to extend around and contact with the edge of the lens, and the mounting is so proportioned that when the hole 8 in one of the parts 5 is in registry with the hole 3 in the lens, a slight clearance 11 is provided between the edge of the lens and the base 9 as shown in Fig. 2.

The hollow spaces 6 and 11, and the hole 3 in the lens, and 8 in the part 5 are all prepared for filling in with a unitary mass of metal 12. In preparation for the final step in securing the lens, the inside surface of the mounting, that is, the parts or surfaces which enclose and define the hollow spaces, are coated with a suitable bonding metal, such as tin, shown at 13, when the mounting is made of brass, the idea being to prepare the mounting so that the filling metal 12 will bond to the mounting.

To complete the mounting, the metal 12 is prepared by heating to a point where it is molten enough to bond to the bonding metal and then by a suitable device is forced into the hollow space between the mounting and the lens through the opening 8 in one of the parts 5. The temperature of the metal is low enough and the quality of the glass of the lens is such that the application of the molten metal in the manner described does not deleteriously affect the lens but results in the rigid securing of the mounting on the lens without any strains which may later result in fracturing the lens. The filling metal is preferably forced into the hollow space by pressure, the lens and the mounting being relatively positioned and held rigidly in any suitable clamping means to properly relate them and hold them rigidly during the application of the binding metal and until the same has solidified, which latter occurs almost instantly on account of the minute quantity of molten metal necessary. In the application of the molten filling metal, it, of course, fills the perforation 3 in the lens, as shown at 14. This part 14 strongly unites the parts above and below the lens and serves as an effective anchor to prevent any relative movement of the mounting and lens except possibly a movement of the mounting on the part 14, as upon a pivot, but such pivotal movement is prevented by the bracing projections 10 which engage the edge of the lens.

The mounting with the applied filling metal, when completed, constitutes a unitary lens mounting means without any movable part or parts which may have to be tightened. However, if through the application of forces beyond which the mounting is designed to stand, the lens should become slightly loosened, it can be readily tightened again by compressing the lens engaging parts by means of a suitable tool because the filling metal is preferably soft, such as lead, and the parts 5 and 10 of the mounting are of such quality that they can be thus readily formed.

The lens mounting is extremely neat in appearance, is simple in construction, it can readily be applied and, for all practical purposes, is permanent.

The mounting as constituted does not provide any unyielding hard metal engaging any of the corners of the lens which might tend to fracture or chip the lens. On the other hand, it does provide what may aptly be termed a cushioned mounting as the filling metal which clasps the glass is relatively soft.

This method of joining the mounting to the lens provides a connection which is free of stresses or strains and the tendency to crack, chip or otherwise destroy the lens is reduced to a minimum.

As many modifications of the invention will readily suggest themselves to one skilled in the art, I do not limit or confine the invention except within the scope of the appended claims.

I claim:

1. An ophthalmic mounting comprising a lens, the lens provided with a hole adjacent to an edge, a securing clip member having projections embracing said edge, the projections being in substantial contact with the faces of the lens and formed to provide interlocking spaces in open communication with opposite ends of said hole, and a securing body of moldable material extending through and completely filling said hole and entering said spaces and thereby interlocking with said projections.

2. The invention as defined in claim 1, one of said projections provided with a perforation through which the moldable material may be inserted.

3. In a lens mounting, a lens having a perforation extending through same from face to face at the mounting point, in combination with a U-shaped mounting clip engaging the edge of the lens and having arms extending over said perforation, the clip being hollow and providing a hollow space beneath each of said arms of larger area than the perforation in the lens and extending around the edge of the lens, and the clip having a perforation in one of its sides through which soft metal can be forced into the hollow space and into the perforation in the lens, and a continuous mass of relatively soft metal filling said hollow space including the perforation in the lens and the edge space thereby forming a soft metal rivet-like lens-engaging member.

4. In a lens mounting, the combination with a lens provided with a cylindrical perforation at the point of mounting, a U-shaped hollow clip providing a hollow space beneath same and extending in U-form around the edge of the lens when the clip is assembled with the lens, and a continuous mass of soft metal filling said U-shaped space and the perforation in the lens, the clip having a perforation through which the soft metal can be forced into said space.

5. In a lens mounting, the combination with a lens provided with a cylindrical perforation at the point of mounting, a hollow U-shaped clip when assembled with the lens providing a hollow space beneath same and extending in U-form around the edge of the lens, and a continuous mass of soft metal filling said U-shaped space and the perforation in the lens, the clip having a perforation in one of its sides and adapted to be arranged in axial alignment with the perforation in the lens and through which the soft metal in molten condition can be forced in to fill said space to retain the clip in place.

6. An ophthalmic mounting comprising two spaced straps, anchoring means on each of said straps, a lens having an opening in communication with the anchoring means of each strap, fusible retaining means positioned in said opening, said retaining means having a portion which is molded to the anchoring means on each of said straps, said retaining means substantially filling said opening and being in contact with its wall.

7. The herein described method of attaching a one piece ophthalmic mounting to a lens having a perforation adjacent to an edge, which comprises providing the mounting with two spaced projections formed to provide closed spaces larger than said perforation in the lens, positioning the mounting with the spaces in communication with said perforation, and molding securing material in and completely filling said perforation and extending into said spaces and thereby interlocking the mounting and the lens.

8. The herein described method of attaching an ophthalmic mounting to a lens having a perforation adjacent to an edge, which comprises providing the mounting with two spaced projections formed to provide spaces larger than said perforation in the lens, positioning the mounting with the open spaces in communication with said perforation, the mounting formed to provide a channel at the edge of the lens connecting said spaces in addition to the perforation in the lens, one of said projections provided with a perforation through which moldable material may be inserted, and inserting moldable securing material through said opening sufficient to fill said spaces, perforation and channel, and retaining the lens and the mounting in such relative position until the moldable material has set and thereby interlocking the mounting and the lens.

9. The method as defined in claim 7, and forming down the edges of said projections on the mounting to contact with the lens, one of said projections provided with a perforation permitting the insertion of moldable material, entering moldable material through said perforation in the projection, molding same in said spaces and completely filling said opening therewith and thereby interlocking the lens and the mounting.

10. An ophthalmic mounting comprising a clip, two spaced straps on the clip, a lens having an opening near an edge, the straps being in substantial contact with the faces of the lens formed to provide interlocking spaces beneath the straps in communication with the ends of said opening, fusible securing means in said spaces and extending through and completely filling said opening and interlocking the clip and lens.

11. An ophthalmic mounting comprising a clip, two spaced straps on the clip, a lens provided with an opening near its edge, the straps being in substantial contact with the lens and each formed to provide an interlocking space at each side of the lens in communication with the opening in the lens, fusible retaining means positioned in and completely filling said opening and having portions molded to the walls of said spaces and interlocking the clip and lens.

12. In combination, a lens having a perforation near one edge, a one piece securing clip member having projections formed to provide dome-like spaces beneath same and extending over the ends of said perforation, and a securing body of moldable material filling said perforation and dome-like spaces and thereby interlocking the lens and clip.

13. In the invention as defined in claim 12, the edges of the projections contacting with the surfaces of the lens.

14. The method of securing a lens in place which consists in providing a lens with a perforation adjacent one edge; arranging a clip with projections extending over said edge and perforation and shaped to form spaces in communication with said perforation, one of said projections being perforated to give access to one of said spaces; and then forcing plastic securing material under pressure through said clip perforation and into and filling said spaces and lens perforation.

15. The method defined in claim 14, in which the plastic material employed is molten metal.

16. The method as defined in claim 7, the securing material being a metal which is readily melted by the application of heat, and the lens opposed surfaces of the mounting having a coating consisting of a metal adapted to readily bond with the securing metal.

17. An ophthalmic mounting comprising a pair of projections positioned, respectively, on opposite faces of a lens having an opening, anchoring means on one of said projections, and an integral mass of fusible material molded to and engaging said anchoring means and filling said opening, one of said straps having an aperture through which said material is introduced.

18. An ophthalmic mounting comprising a strap having two spaced ears positioned, respectively, on opposite faces of a lens having an opening, one of said straps being imperforate and constructed so as to provide a hollow space in communication with said opening, and a unitary mass of fusible material substantially filling said space and opening, the other strap having an opening through which said material is introduced.

19. An ophthalmic mounting comprising a pair of projections positioned, respectively, on opposite faces of a lens having an opening, an integral mass of fusible material positioned in and substantially filling said opening and having enlarged, integral head portions extending beyond the respective faces of the lens, said projections being constructed and arranged to receive said head portions in anchoring engagement.

20. An ophthalmic mounting comprising a pair of straps positioned, respectively, on opposite faces of a lens having an opening, one of said straps being imperforate and constructed and arranged to provide a recess between the outer face of the strap and the lens, said recess being in communication with said opening, fusible material filling said recess and opening, said material being anchored at each face of the lens, the other of said straps having an aperture through which said material is introduced.

21. An ophthalmic mounting comprising a pair of projections positioned, respectively, on opposite faces of a lens having an opening, anchoring means on each of said projections in communication with said opening, fusible retaining means filling said opening and having integral portions molded to the anchoring means on each projection, one of said projections being imperforate and the other projection having an aperture for the introduction of the fusible retaining means.

22. In an ophthalmic mounting the combination of a projection positioned on one face of a lens having an opening, said projection being constructed and arranged to provide a recess in communication with said opening, a fusible retaining material substantially filling said opening, said material having an integral portion anchored within said recess, said material also having an enlarged integral head portion positioned against the other face of the lens.

23. An ophthalmic mounting comprising a strap having an ear positioned on a surface of a lens having an opening, anchoring means on said ear, said means comprising a recess located between the outer face of the ear and the surface of the lens, and fusible retaining means substantially filling said opening, said retaining means being anchored to the lens and in anchoring engagement with said anchoring means on the ear.

CLETUS F. KRAMER.